US010167907B2

United States Patent
Satoyoshi et al.

(10) Patent No.: US 10,167,907 B2
(45) Date of Patent: Jan. 1, 2019

(54) HYBRID VEHICLE DRIVE APPARATUS

(71) Applicant: Honda Motor Co., Ltd., Tokyo (JP)

(72) Inventors: Takashi Satoyoshi, Wako (JP); Kohei Iizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/960,153

(22) Filed: Apr. 23, 2018

(65) Prior Publication Data

US 2018/0313411 A1 Nov. 1, 2018

(30) Foreign Application Priority Data

Apr. 27, 2017 (JP) .................................. 2017-088608

(51) Int. Cl.

| | |
|---|---|
| *B60K 6/40* | (2007.10) |
| *F16D 25/10* | (2006.01) |
| *F16H 57/023* | (2012.01) |
| *B60K 6/387* | (2007.10) |
| *B60K 6/26* | (2007.10) |
| *B60L 15/20* | (2006.01) |
| *F16D 21/08* | (2006.01) |

(52) U.S. Cl.
CPC ............... *F16D 25/10* (2013.01); *B60K 6/26* (2013.01); *B60K 6/387* (2013.01); *F16H 57/023* (2013.01); *B60L 15/2054* (2013.01); *F16D 21/08* (2013.01)

(58) Field of Classification Search
CPC .... B60W 10/02; B60W 10/023; B60W 10/08; B60K 6/38; B60K 6/387; B60K 6/40; B60K 6/405

USPC ..................................................... 477/5, 6, 8
See application file for complete search history.

(56) References Cited

U.S. PATENT DOCUMENTS

| | | | | |
|---|---|---|---|---|
| 5,415,603 A | * | 5/1995 | Tuzuki ..................... | B60K 6/26 477/138 |
| 5,875,691 A | * | 3/1999 | Hata ........................ | B60K 6/365 475/5 |

(Continued)

FOREIGN PATENT DOCUMENTS

JP 2002087080 A 3/2002

*Primary Examiner* — Jeffrey J Restifo
(74) *Attorney, Agent, or Firm* — Duft & Bornsen, PC

(57) ABSTRACT

A hybrid vehicle drive apparatus, including a prime-mover-output-shaft, a transmission-input-shaft and a motor-rotor provided therebetween, each rotatable around an axis-line, a first-clutch arranged radially inward of the rotor to connect/disconnect the output-shaft and the motor, a second clutch arranged radially inward of the rotor axially in tandem with the first-clutch to connect/disconnect the motor and the input-shaft, and a cover-member having a radially extending first, second-sidewall-members and a substantially cylindrical connection-member connecting the first, second-sidewall-members, integrally rotatable with the motor, forming a clutch-chamber enclosing the first, second-clutches by means of the first, second-sidewall-members and the connection-member, and formed with an oil-discharge-port connecting the clutch-chamber and a drain-oil-chamber sideward of the clutch-chamber, wherein the cover-member has first, second-cover-members axially disassemblable at the connection-member and each having a fitting-member fitted integrally rotatable with each other.

8 Claims, 5 Drawing Sheets

(56) References Cited

U.S. PATENT DOCUMENTS

| | | | | |
|---|---|---|---|---|
| 6,258,001 B1* | 7/2001 | Wakuta | | B60K 6/26 192/3.28 |
| 6,508,348 B2* | 1/2003 | Sugano | | B60K 6/40 192/110 B |
| 6,524,216 B2* | 2/2003 | Suzuki | | B60K 6/365 477/3 |
| 6,777,837 B2* | 8/2004 | Tsuzuki | | B60K 6/40 180/65.26 |
| 6,863,140 B2* | 3/2005 | Noreikat | | B60K 6/40 180/65.23 |
| 6,966,867 B2* | 11/2005 | Tajima | | B60K 6/485 290/40 R |
| 7,111,698 B2* | 9/2006 | Tajima | | B60K 6/40 180/170 |
| 7,191,859 B2* | 3/2007 | Hashimoto | | B60K 6/26 180/65.25 |
| 7,322,903 B2* | 1/2008 | Ortmann | | B60K 6/387 477/98 |
| 7,339,300 B2* | 3/2008 | Burgman | | B60K 6/26 180/65.1 |
| 7,608,011 B2* | 10/2009 | Grabowski | | B60K 6/40 477/5 |
| 8,333,680 B2* | 12/2012 | Kasuya | | B60W 20/15 477/5 |
| 8,360,928 B2* | 1/2013 | Tabata | | B60K 6/365 477/4 |
| 8,376,905 B2* | 2/2013 | Kasuya | | B60K 6/387 477/5 |
| 8,448,541 B2* | 5/2013 | Kasuya | | B60K 6/387 180/65.245 |
| 8,545,355 B2* | 10/2013 | Frait | | B60K 6/26 475/149 |
| 8,545,367 B2* | 10/2013 | Hartz | | B60K 6/40 477/5 |
| 8,622,182 B2* | 1/2014 | Iwase | | B60K 6/26 180/65.26 |
| 8,636,091 B2* | 1/2014 | Sanji | | B60K 6/26 180/65.23 |
| 8,652,001 B2* | 2/2014 | Iwase | | B60K 6/40 477/8 |
| 8,690,726 B2* | 4/2014 | Miyazaki | | B60K 6/26 477/5 |
| 8,839,922 B2* | 9/2014 | Ideshio | | B60K 6/26 192/3.25 |
| 8,845,484 B2* | 9/2014 | Kamiya | | F16D 48/0206 192/3.25 |
| 8,851,254 B2* | 10/2014 | Ideshio | | B60K 6/40 192/3.25 |
| 8,974,339 B2* | 3/2015 | Ideshio | | F16H 41/24 192/3.21 |
| 8,991,577 B2* | 3/2015 | Hauck | | F16D 21/06 192/48.609 |
| 8,997,956 B2* | 4/2015 | Iwase | | B60K 6/26 192/3.26 |
| 9,068,638 B2* | 6/2015 | Iwase | | B60K 6/26 |
| 9,108,635 B2* | 8/2015 | Miyazaki | | B60K 6/48 |
| 9,132,834 B2* | 9/2015 | Ideshio | | B60K 6/383 |
| 9,175,759 B2* | 11/2015 | Iwase | | F16H 45/00 |
| 9,263,924 B2* | 2/2016 | Frait | | H02K 7/006 |
| 9,266,419 B2* | 2/2016 | Iwase | | H02K 5/225 |
| 9,446,763 B2* | 9/2016 | Larkin | | B60K 6/387 |
| 9,447,864 B2* | 9/2016 | Iwase | | B60K 6/405 |
| 9,528,436 B2* | 12/2016 | Kasuya | | F02B 63/04 |
| 9,581,210 B2* | 2/2017 | Frait | | B60K 6/48 |
| 9,636,990 B2* | 5/2017 | Kasuya | | B60L 3/0061 |
| 9,670,838 B2* | 6/2017 | Iwase | | F16D 33/02 |
| 9,878,605 B2* | 1/2018 | Inoue | | B60L 3/0023 |
| 9,950,605 B2* | 4/2018 | Suyama | | B60K 6/387 |
| 2002/0066607 A1* | 6/2002 | Levin | | B60K 6/22 180/65.25 |
| 2004/0206599 A1* | 10/2004 | Hegerath | | F16D 21/06 192/48.611 |
| 2006/0144665 A1* | 7/2006 | Janson | | B60K 6/48 192/48.8 |
| 2007/0175723 A1* | 8/2007 | Blessing | | B60K 6/387 192/48.8 |
| 2007/0289833 A1* | 12/2007 | Chapelon | | B60K 6/387 192/48.1 |
| 2008/0015085 A1* | 1/2008 | Chapelon | | B60K 6/387 477/6 |
| 2008/0047799 A1* | 2/2008 | Combes | | B60K 6/387 192/58.5 |
| 2009/0008212 A1* | 1/2009 | Combes | | B60K 6/387 192/113.34 |
| 2009/0105040 A1* | 4/2009 | Sanji | | B60K 6/40 477/5 |
| 2010/0109461 A1* | 5/2010 | Kato | | B60K 6/26 310/90 |
| 2012/0242199 A1* | 9/2012 | Iwase | | B60K 6/40 310/68 B |
| 2013/0193816 A1* | 8/2013 | Iwase | | H02K 7/003 310/75 R |
| 2014/0113760 A1* | 4/2014 | Diemer | | B60K 6/365 475/149 |
| 2014/0230423 A1* | 8/2014 | Iwase | | B60K 6/26 60/445 |
| 2015/0000262 A1* | 1/2015 | Iwase | | F16H 45/00 60/330 |
| 2017/0203643 A1* | 7/2017 | Suyama | | B60K 6/387 |

\* cited by examiner

LEFT ← → RIGHT

HYBRID VEHICLE DRIVE APPARATUS

CROSS-REFERENCE TO RELATED APPLICATION

This application is based upon and claims the benefit of priority from Japanese Patent Application No. 2017-088608 filed on Apr. 27, 2017, the content of which is incorporated herein by reference.

BACKGROUND OF THE INVENTION

Field of the Invention

This invention relates to a drive apparatus for a hybrid vehicle which has an engine and an electric motor as a traveling driving source.

Description of the Related Art

As apparatuses of this type are known ones that comprise a first clutch for connecting and disconnecting an engine and an electric motor (motor-generator) and a second clutch for connecting and disconnecting the electric motor and a transmission. Such an apparatus is set out in Japanese Unexamined Patent Publication No. 2002-087080 (JP2002-087080A), for example. In an apparatus set out in JP2002-087080A, a substantially cylindrical clutch casing is rotatably supported on a shaft member of a housing, an electric motor rotor is supported on an outer peripheral surface of the clutch casing, and a first clutch and second clutch are arranged axially in tandem in an inner space of the clutch casing. After oil supplied into the casing interior cools the clutches, it is discharged through an oil discharge port formed in a cylindrical portion of the clutch casing and into an electric motor housing space in the clutch housing.

In the apparatus of JP2002-087080A, oil that cooled the clutches is discharged through the oil discharged port into the motor housing space. Since hot oil therefore hits the motor, performance and service life of the motor is adversely affected.

SUMMARY OF THE INVENTION

An aspect of the present invention is a hybrid vehicle drive apparatus, including: a prime mover having an output shaft rotatable around an axis line; a transmission having an input shaft rotatable around the axis line; an electric motor having a rotor of substantially cylindrical shape provided between the prime mover and the transmission to be rotatable around the axis line, and a stator arranged around the rotor; a first clutch of multi-plate wet type arranged radially inward of the rotor and configured to connect and disconnect a first power transmission path between the output shaft of the prime mover and the electric motor; a second clutch of multi-plate wet type arranged radially inward of the rotor and side by side with the first clutch in an axial direction of the axis line, and configured to connect and disconnect a second power transmission path between the electric motor and the input shaft of the transmission; and a cover member having a first sidewall member and a second sidewall member each extending radially and a connection member of substantially cylindrical shape configured to connect the first sidewall member and the second sidewall member, the cover member being rotatably provided around the axial line to integrally rotate with the electric motor, the cover member forming a clutch chamber enclosing the first clutch and the second clutch by means of the first sidewall member, the second sidewall member and the connection member, the cover member being formed with an oil discharge port connecting the clutch chamber and a drain oil chamber sideward of the clutch chamber, wherein the cover member has a first cover member and a second cover member axially disassemblable at the connection member, and each of the first cover member and the second cover member has a fitting member fitted in the axial direction to be integrally rotatable with each other.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
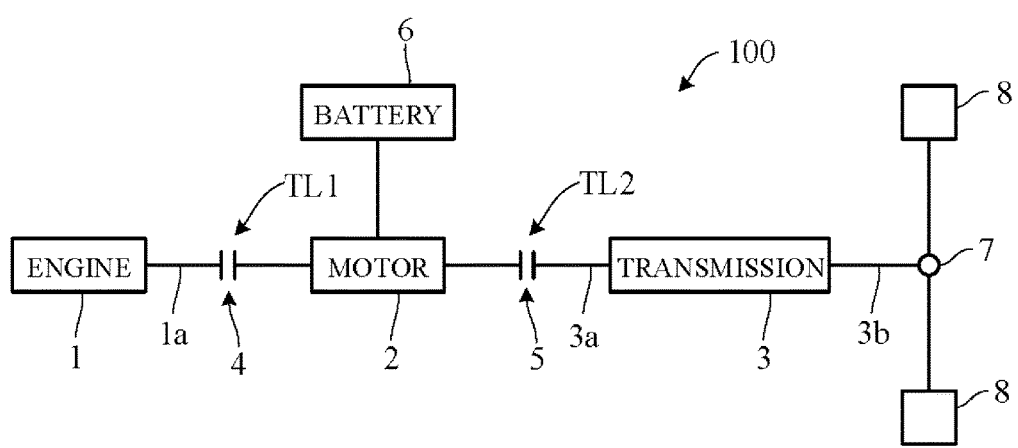
FIG. 1 is a diagram schematically showing overall configuration of a hybrid vehicle drive apparatus according to an embodiment of the present invention.

An embodiment of the present invention is explained in the following with reference to FIGS. 1 to 7. An embodiment of the present invention is applied to a front-wheel-drive (FF layout) hybrid vehicle having an engine and an electric motor as propulsion power sources. However, the hybrid vehicle is not limited to the front-wheel-drive layout and can instead adopt some other type of drive system (e.g., a rear-wheel-drive layout). FIG. 1 schematically illustrates overall configuration of the hybrid vehicle drive system 100 according to an embodiment of the present invention.

As shown in FIG. 1, the drive apparatus 100 comprises an engine 1, a motor 2, a transmission 3, a disconnect clutch 4, a start clutch 5, and a battery 6.

The engine 1 is an internal combustion engine powered by explosively burning fuel, and can be a gasoline, diesel or other type internal combustion engine. An output shaft 1a is constituted by a crankshaft or by a rotating shaft connected to a crankshaft. The disconnect clutch 4 is installed in a first power transmission path TL1 between the engine 1 and motor 2. The disconnect clutch 4 makes and breaks the first power transmission path TL1, whereby motive power is or is not transmitted between the engine 1 and the motor 2.

The motor 2, which is electrically connected to the battery 6, functions as a motor driven by power supplied from the battery 6 and, during braking, functions as a generator that generates power and stores generated power in the battery 6. In other words, the motor 2 operates as a motor-generator. Charge/discharge of the battery 6 is controlled by an unshown control unit. Alternatively, a capacitor or other power storage device can be used instead of the battery 6. The start clutch 5 is installed in a second power transmission path TL2 between the motor 2 and the transmission 3. The start clutch 5 makes and breaks the second power transmission path TL2, whereby motive power is or is not transmitted between the motor 2 and the transmission 3.

The transmission 3 includes hydraulic components driven by hydraulic force and is configured to respond to hydraulic driving of the components by transmitting speed-adjusted rotation of an input shaft 3a to an output shaft 3b and by converting and transmitting to the output shaft 3b torque input to the input shaft 3a. Since the transmission 3 can be used a stepped transmission that manually or automatically shifts among multiple speed stages differing in speed ratio or a continuously variable transmission capable of varying speed ratio steplessly. Torque transmitted to the output shaft 3b is transmitted through a differential mechanism 7 to left and right drive wheels (front wheels) 8, thereby propelling the vehicle.

Typical operating modes of the hybrid vehicle incorporating the aforesaid drive apparatus 100 will be explained. Operating mode changes in response to engagement (ON) and disengagement (OFF) of the disconnect clutch 4 and the start clutch 5. When the clutches 4 and 5 are engaged and disengaged, the power transmission paths TL1 and TL2 are connected and disconnected.

In stopped condition of the vehicle, with the disconnect clutch 4 turned OFF and the start clutch 5 turned ON, when the motor 2 is driven by power supplied from the battery 6, motive power of the motor 2 is transmitted through the start clutch 5 to the transmission 3. Since this drives the wheels 8, the vehicle begins to run (motor-driven start-off). Thereafter, once rotational speed of the motor 2 has risen, the disconnect clutch 4 is gradually turned ON, so that power of the motor 2 starts the engine 1 by rotating its crankshaft.

When driving force of the engine 1 increases from this state, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When the disconnect clutch 4 is turned OFF while the vehicle is running at a predefined speed, the vehicle thereafter runs solely under power of the motor 2 (EV driving). During vehicle deceleration, the motor 2 is rotated by torque of the transmission 3 received through the start clutch 5. As a result, the motor 2 generates electric power and charges the battery 6 (regeneration).

In stopped condition of the vehicle, when the disconnect clutch 4 is turned ON and the start clutch 5 is turned OFF, the motor 2 is driven by motive power of the engine 1 transmitted through the disconnect clutch 4. The motor 2 therefore generates electric power and charges the battery 6 (stopped-vehicle charging). When the start clutch 5 is gradually turned on while continuing to charge the battery 6, power of the engine 1 is transmitted through the disconnect clutch 4 and the start clutch 5 to the transmission 3. Since this drives the wheels 8, the vehicle begins to run (engine-driven start-off).

In this state, when electric power is supplied to the motor 2 from the battery 6, while motive power of the engine 1 increases, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When supply of power from the battery 6 to the motor 2 is stopped, the vehicle thereafter runs solely under power of the engine 1 (engine driving). When the motor 2 is driven by motive power of the engine 1 at this time, the battery 6 can be charged during engine driving (driving-vehicle charging).

Essential components of the hybrid vehicle drive apparatus 100 according to the embodiment of the present invention are explained in the following. In the present embodiment, the pair of clutches 4 and 5 are installed axially in tandem in the clutch chamber radially inward of the motor 2 in order to efficiently and compactly accommodate the motor 2 and the pair of clutches 4 and 5 in a limited space between the engine 1 and the transmission 3. In order to facilitate understanding of the hybrid vehicle drive apparatus 100 according to the present embodiment, a comparative example of the present embodiment is explained first in the following.

Figure 2:
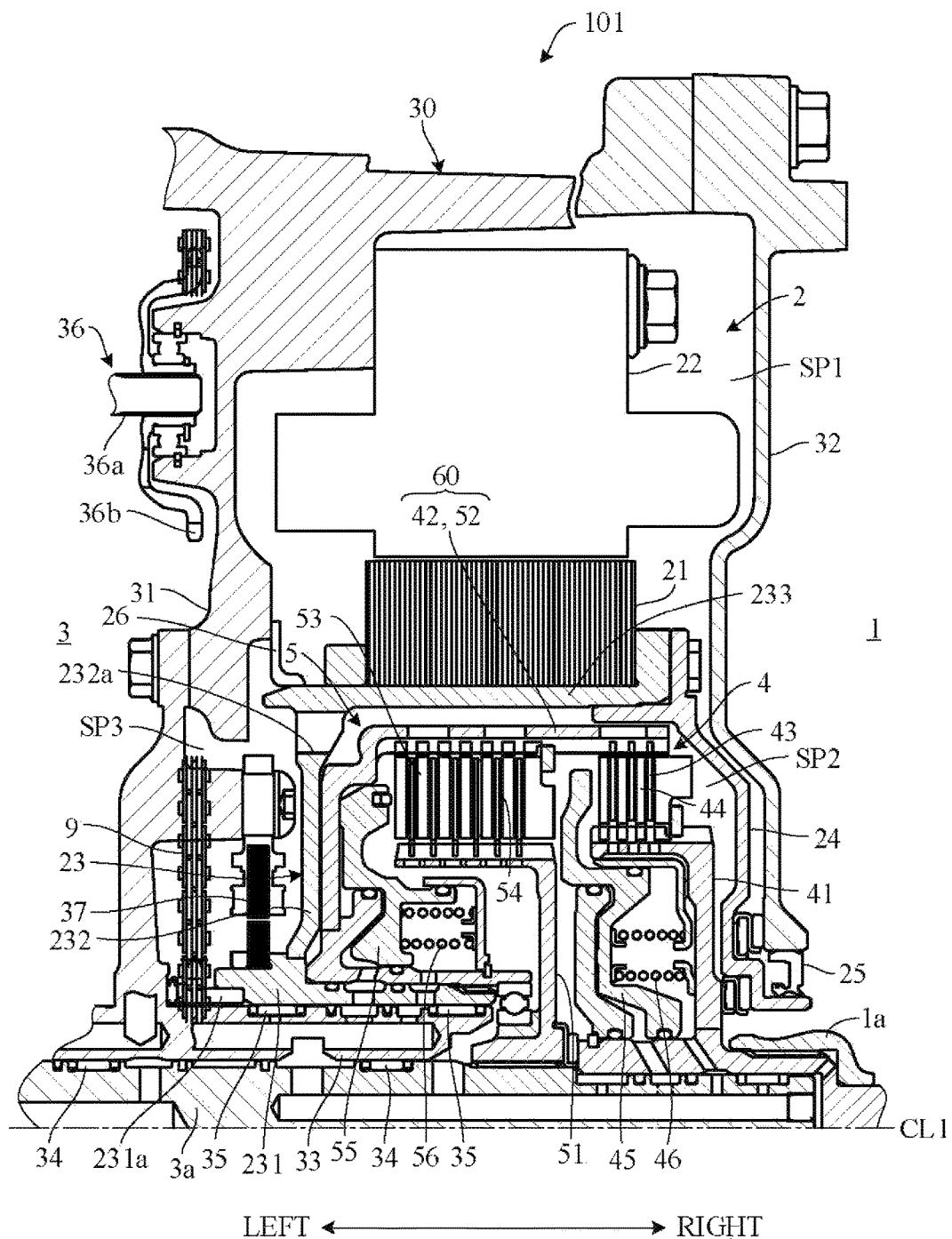
FIG. 2 is a sectional view showing essential components of a drive apparatus as an example for comparison with the hybrid vehicle drive apparatus according to the embodiment of the present invention.

FIG. 2 is a sectional view showing essential components of a hybrid vehicle drive apparatus 101 as an example for comparison with the present embodiment. For convenience of explanation, CL1 in the drawing is defined to be a lateral axis, and relation among structural components is explained using this definition. Lateral direction corresponds to vehicle longitudinal direction or width direction, for example. Axis CL1 is coincident with center of rotation of the output shaft 1a of the engine 1 (FIG. 1), the motor 2 and the input shaft 3a of the transmission 3. The motor 2 is oriented coaxially with the output shaft 1a and the input shaft 3a. Direction parallel to axis CL1 (lateral direction) is called axial direction and direction orthogonal to axis CL1 is called radial direction.

As shown in FIG. 2, mainly the motor 2, the disconnect clutch 4 and the start clutch 5 are installed between radially extending left and right sidewalls (left sidewall 31 and right sidewall 32). The sidewalls 31 and 32 constitute part of a transmission case and other case members 30 rigidly mounted in and engine room. The transmission 3 is installed on the left side of the left sidewall 31, and the engine 1 is installed on the right side of the right sidewall 32. Optionally, a damper for absorbing rotational fluctuation of the engine 1 can be provided between the right sidewall 32 and the engine 1. The sidewalls 31 and 32 define an opening centered on axis CL1.

A substantially cylindrical shaft member 33 centered on axis CL1 is provided to extend rightward and leftward at a radially inner end portion of the left sidewall 31. An input shaft 3a is rotatably supported inside (in opening of) the shaft member 33 by multiple axially spaced bearings 34. The bearings 34 are constituted as needle bearings, for example. The input shaft 3a projects and extends rightward from the right end face of the shaft member 33 and penetrates an inner side (opening) of the right sidewall 32.

The motor 2 comprises a substantially cylindrical rotor 21 centered on axis CL1 and a substantially cylindrical stator 22 installed centered on axis CL1 to surround the rotor 21 at a specified clearance from an outer peripheral surface of the rotor 21. The stator 22 is fastened to the left sidewall 31 by through bolts. The rotor 21 is rotatably supported by a rotor support member 23. The motor 2 is accommodated and arranged in a motor chamber SP1 of substantially annular space around the axis CL1.

The rotor support member 23 comprises an axis CL-centered substantially cylindrical shaft member 231 rotatably fitted on an outer peripheral surface of the shaft member 33 through multiple axially spaced bearings 35, a sidewall member 232 extending radially outward from the shaft member 231 leftward of a left end face of the rotor 21 so as to face the left sidewall 31, and an axis CL-centered substantially cylindrical retaining member 233 extending rightward from a radially outer end portion of the sidewall member 232. The bearings 35 are constituted as needle bearings, for example. An inner peripheral surface of the rotor 21 is fitted on the outer peripheral surface of the retaining member 233, and the rotor 21 is fixed on the retaining member 233. As a result, the rotor 21 is cantilevered from the shaft member 33 through the rotor support member 23.

A resolver 37 is attached to the left sidewall 31 so as to face the shaft member 231 of the rotor support member 23. Since the shaft member 231 rotates integrally with the rotor 21 of the motor 2, the resolver 37 can detect rotation angle of the rotor 21. In addition, a hydraulic pump 36 (only partially visible) is attached to the left sidewall 31. When its rotating shaft 36a is rotated, the hydraulic pump 36 supplies hydraulic oil to, inter alia, various hydraulic components in the transmission 3 and the clutches 4 and 5, and also supplies lubricating oil to points requiring lubrication. The hydraulic pump 36 has a gear unit 36b that rotates integrally with the rotating shaft 36a.

The left end portion of the shaft member 231 of the rotor support member 23 is, at the same axial position as the gear unit 36b, provided throughout its circumference with a gear unit 231a. An endless belt-like chain 9 is wound around the gear unit 36b and gear unit 231a, thereby arranging the chain 9 between the rotor support member 23 and the left sidewall 31. Rotation of the motor 2 is therefore transmitted through the chain 9 to the hydraulic pump 36, whereby the hydraulic pump 36 can be driven irrespective of engine 1 starting and/or the clutch 4 and 5 operation.

A cover 24 is fastened to a right end portion of the retaining member 233, and an oil seal 25 is provided at an end portion of the cover 24 so as to block a gap between the cover 24 and the right sidewall 32. A clutch chamber SP2 is formed between the sidewall member 232 of the rotor support member 23 and the cover 24 at a location radially inward of the retaining member 233. The start clutch 5 and the disconnect clutch 4 are arranged laterally in tandem in the clutch chamber SP2. The clutches 4 and 5 are configured as multi-plate wet clutches. The cover 24 forms a partition between the motor chamber SP1 and the clutch chamber SP2 and prevents oil from passing on the right side of the rotor 21, i.e., prevents flow of oil from the clutch chamber SP2 to the motor chamber SP1.

An oil chamber (drain oil chamber) SP3 for oil discharge is provided between the rotor support member 23 and the left sidewall 31. The clutch chamber SP2 and the drain oil chamber SP3 communicate through an oil discharge port (oil discharge hole) 232a formed in the sidewall member 232 of the rotor support member 23. An oil seal 26 is provided between a left end portion of the retaining member 233 of the rotor support member 23 and the left sidewall 31. The oil seal 26 prevents oil from passing on the left side of the rotor 21, i.e., prevents flow of oil from the drain oil chamber SP3 to the motor chamber SP1. Owing to the blocking of communication between the motor chamber SP1 and both the clutch chamber SP2 and the drain oil chamber SP3 in this manner, flow of hot lubricating oil into the motor chamber SP1 can be prevented.

The disconnect clutch 4 comprises a clutch hub 41, a clutch drum 42, outer plates 43, inner plates 44, a clutch piston 45, and a return spring 46. Similarly, the start clutch 5 comprises a clutch hub 51, a clutch drum 52, outer plates 53, inner plates 54, a clutch piston 55, and a return spring 56. The clutch drums 42 and 52 share a single common clutch drum hereinafter designated by symbol 60.

Figure 3:
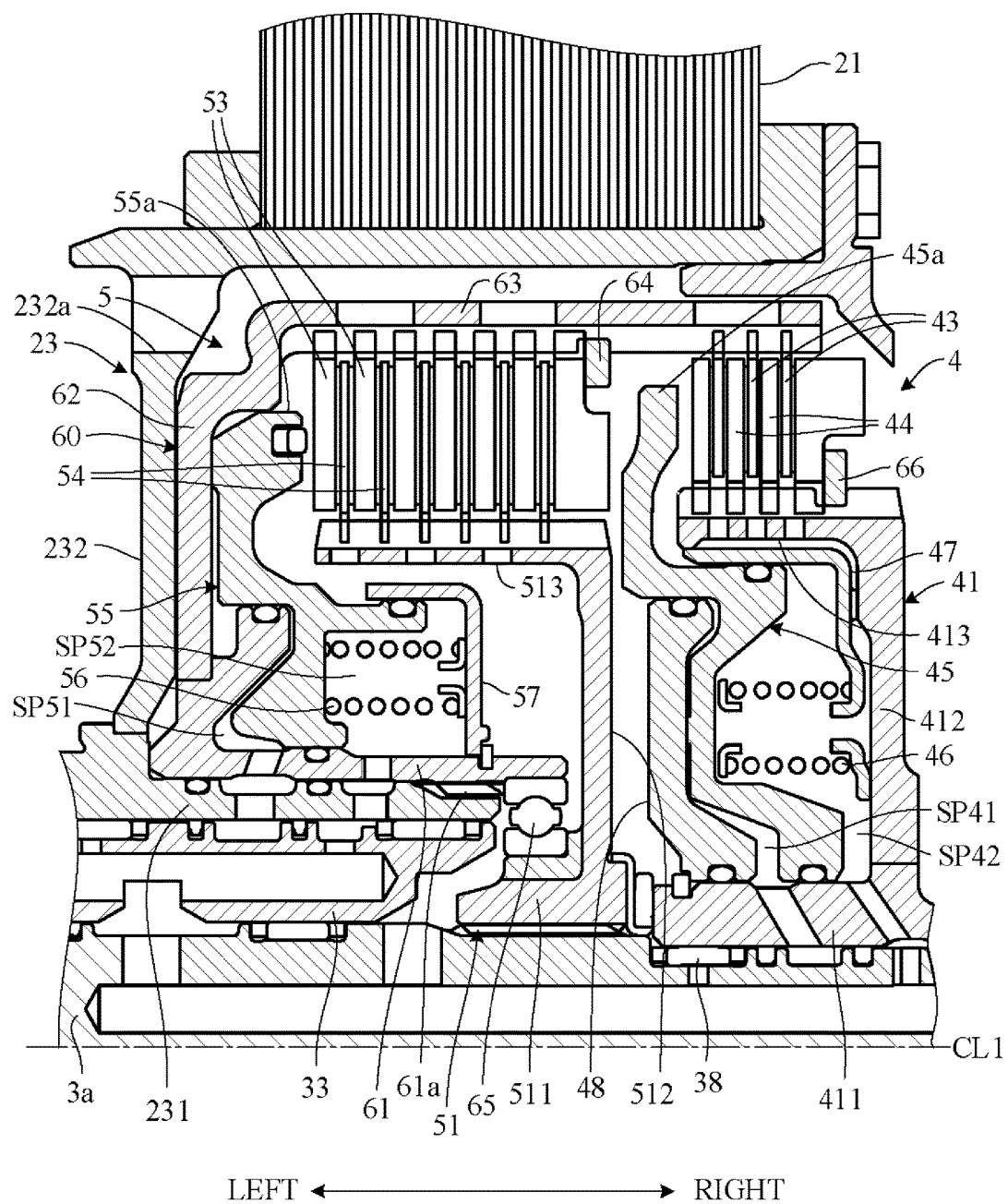
FIG. 3 is an enlarged view of an essential part of FIG. 2.

There now follows a detailed explanation of the structure of the clutches 4, 5 of FIG. 2. FIG. 3 is an enlarged view of an essential part of FIG. 2. As shown in FIG. 3, the clutch drum 60 comprises an axis CL1-centered substantially cylindrical shaft member 61 fitted on an outer peripheral surface of the shaft member 231 of the rotor support member 23, a sidewall member 62 extending radially outward from a left end portion of the shaft member 61, and an axis CL1-centered substantially cylindrical guide member 63 extending rightward from a radially outer end portion of the sidewall member 62.

The shaft member 61 is engaged with the shaft member 231 through a spline 61a formed on its inner peripheral surface, and the clutch drum 60 rotates integrally with the rotor support member 23. A left end portion of the shaft member 61 abuts on rotor support member 23, and a right end portion of the shaft member 61 projects rightward beyond a right end face of the shaft member 231. The sidewall member 62 is arranged slightly spaced from or in abutment with the sidewall member 232 of the rotor support member 23.

A spline is formed on the inner peripheral surface of the guide member 63, and the multiple outer plates 43 of the disconnect clutch 4 and the multiple outer plates 53 of the start clutch 5 axially movably engage the spline. Moreover, a stop 64 is fixed on the inner peripheral surface of the guide member 63 at a specified axial position, and the outer plates 53 and the outer plates 43 axially movably engage the stop 64 on its left side and right side, respectively.

The clutch hub 51 of the start clutch 5 comprises an axis CL1-centered substantially cylindrical shaft member 511, a sidewall 512 extending radially outward from a right end portion of the shaft member 511 and passing rightward of the shaft member 61 of the clutch drum 60, and an axis CL1-centered substantially cylindrical guide member 513 extending leftward from a radially outer end of the sidewall 512. An inner peripheral surface of the shaft member 511 is spline-coupled with an outer peripheral surface of the input shaft 3a, so that the clutch hub 51 rotates integrally with the input shaft 3a.

An outer peripheral surface of the guide member 513 of the clutch hub 51 faces the inner peripheral surface of the guide member 63 of the clutch drum 60. Splines are formed on this outer surface, and the multiple inner plates 54 are axially (laterally) movably engaged with the splines alternately with the outer plates 53. The outer plates 53 and inner plates 54 are collectively called a plate group. Movement of the plates 53 and 54 toward right is restricted by the stop 64. A bearing (e.g., ball bearing) 65 is interposed between the shaft member 511 of the clutch hub 51 and the shaft member 61 of the clutch drum 60.

The clutch piston 55 of the start clutch 5 is slidably fitted on an outer peripheral surface of the shaft member 61 of the clutch drum 60. A spring seat plate 57 is supported on the outer peripheral surface of the shaft member 61 at a specified position rightward of the clutch piston 55, and the return spring 56 is interposed between the clutch piston 55 and the spring seat plate 57. An abutment member 55a is provided on a radially outward right end portion of the clutch piston 55 so as to abut a left end face of the plate group 53-54 (more exactly, left end face of the leftmost outer plate 53). Oil chambers SP51 and SP52 are formed between the clutch piston 55 and the sidewall member 62 and between the clutch piston 55 and the spring seat plate 57, respectively.

In initial state prior to application of hydraulic pressure to the oil chamber SP51, the clutch piston 55 is pushed leftward by biasing force of the return spring 56, as illustrated, whereby the clutch piston 55 abuts the sidewall member 62 of the clutch drum 60. In this state, no contacting pressure acts between the outer plates 53 and the inner plates 54, so that the plates 53 and 54 are mutually rotatable. Since the start clutch 5 is therefore disengaged, transmission of motive power between the rotor 21 of the motor 2 and the input shaft 3a of the transmission 3 is cut off.

On the other hand, when hydraulic pressure supplied through oil supply passages provided in the input shaft 3a and shaft members 33, 231 and 61 is applied to the oil chamber SP51, the clutch piston 55 is pushed rightward overcoming the biasing force of the return spring 56. Since the outer plates 53 and inner plates 54 are therefore pushed rightward, contacting pressure acting mutually among the plates 53 and 54 engages the start clutch 5. As a result, transmission of motive power from the rotor 21 of the motor 2 through the start clutch 5 to the input shaft 3a is enabled. (Hydraulic pressure (very low hydraulic pressure) can be supplied to the oil chamber SP52 through the oil supply passages provided in the input shaft 3a and shaft members 33, 231 and 61.) Leftward pressing force acting on the clutch piston 55 is mostly biasing force of the return spring 56 and centrifugal hydraulic pressure produced by rotation of the clutch proper, and engaging force of the start clutch 5 can be adjusted by adjusting hydraulic force counter to this pressing force acting in the oil chamber SP51.

The clutch hub 41 of the disconnect clutch 4 comprises an axis CL1-centered substantially cylindrical shaft member 411, a sidewall 412 extending radially outward from an axially center portion of the shaft member 411, and an axis CL1-centered substantially cylindrical guide member 413 extending leftward from a radially outer end of the sidewall 412. The shaft member 411 is relatively rotatably fitted on the outer peripheral surface of the input shaft 3a through multiple axially spaced bearings 38. A right end portion of the shaft member 411 is spline-coupled to a left end portion of the output shaft 1a of the engine 1 (shown in FIG. 2), so that the clutch hub 41 rotates integrally with the output shaft 1a.

An outer peripheral surface of the guide member 413 of the clutch hub 41 faces the inner peripheral surface of the guide member 63 of the clutch drum 60. Splines are formed on this outer surface, and the multiple inner plates 44 are axially (laterally) movably engaged with the splines alternately with the outer plates 43. The outer plates 43 and inner plates 44 are collectively called a plate group. A stop 66 is fixed on the outer peripheral surface of the guide member 413, and movement of the plates 43 and 44 toward right is restricted by the stop 66.

The clutch piston 45 of the start clutch 4 is slidably fitted on an outer peripheral surface of the shaft member 411 of the clutch hub 41. A spring seat plate 47 is fitted radially inward of the guide member 413 of the clutch hub 41. A right end face of the spring seat plate 47 abuts a left end face of the sidewall 412 of the clutch hub 41, and the return spring 46 is interposed between the clutch piston 45 and the spring seat plate 47. A stop plate 48 for limiting leftward movement of the clutch piston 45 is fitted on the outer peripheral surface the shaft member 411 of the clutch hub 41. An abutment member 45a is provided on a radially outward right end portion of the clutch piston 45 so as to abut a left end face of the plate group 43-44 (more exactly, left end face of the leftmost outer plate 44). Oil chambers SP41 and SP42 are formed between the clutch piston 45 and the stop plate 48 and between the clutch piston 45, the clutch hub 41 and the spring seat plate 47, respectively.

In initial state prior to application of hydraulic pressure to the oil chamber SP41, the clutch piston 45 is pushed leftward by biasing force of the return spring 46, as illustrated, whereby the clutch piston 45 abuts the stop plate 48. In this state, no contacting pressure acts between the outer plates 43 and the inner plates 44, so that the plates 43 and 44 are mutually rotatable. Since the disconnect clutch 4 is therefore disengaged, transmission of motive power between the rotor 21 of the motor 2 and the output shaft 1a (FIG. 2) of the engine 1 is cut off.

On the other hand, when hydraulic pressure supplied through oil supply passages provided in the input shaft 3a and shaft member 411 is applied to the oil chamber SP41, the clutch piston 45 is pushed rightward overcoming the biasing force of the return spring 46. Since the outer plates 43 and inner plates 44 are therefore pushed rightward, contacting pressure acting mutually among the plates 43 and 44 engages the disconnect clutch 4. As a result, transmission of motive power from the rotor 21 of the motor 2 through the disconnect clutch 4 to the output shaft 1a is enabled. (Hydraulic pressure (very low hydraulic pressure) can be supplied to the oil chamber SP42 through the oil supply passages provided in the input shaft 3a and shaft member 411.) Leftward pressing force acting on the clutch piston 45 is mostly biasing force of the return spring 46 and centrifugal hydraulic pressure produced by rotation of the clutch proper, and engaging force of the disconnect clutch 4 can be adjusted by adjusting hydraulic force counter to this pressing force acting in the oil chamber SP41.

The disconnect clutch 4 and the start clutch 5 are multi-plate wet clutches. Cooling lubricant is therefore supplied to the plates 43 and 44 of the disconnect clutch 4 and the plates 53 and 54 of the start clutch 5 via through-holes formed in the guide members 413 and 513 of the clutch hubs 41 and 51, and in the guide member 63 of the clutch drum 60. The supplied lubricant outflows from the clutch chamber SP2 (FIG. 2) through a gap between an inner peripheral surface of the retaining member 233 and an outer peripheral surface of the guide member 63 and the oil discharge port 232a formed in the sidewall member 232.

Figure 4:
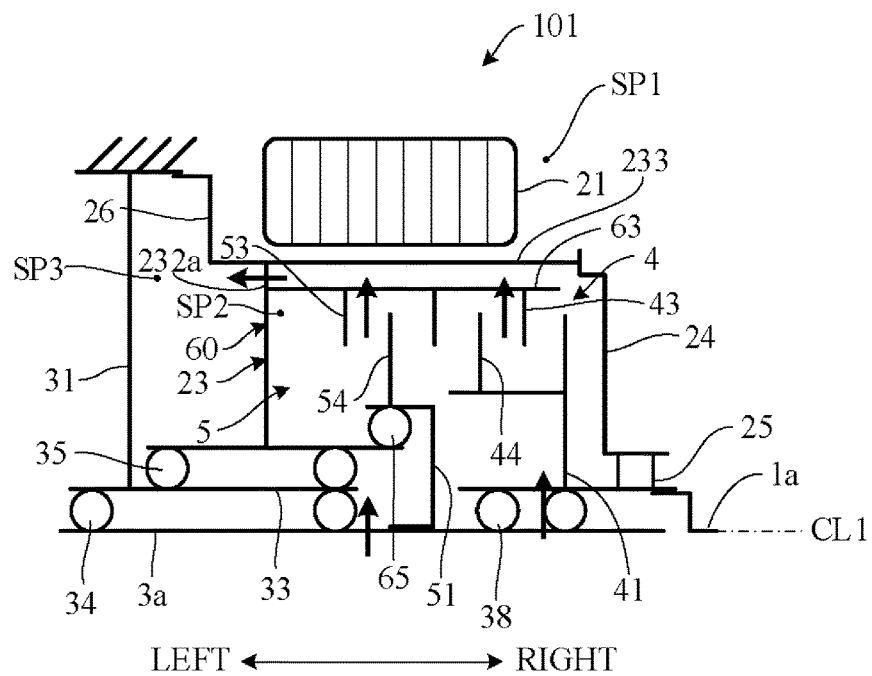
FIG. 4 is a skeleton diagram schematically showing essential components of the drive apparatus as an example for comparison with the hybrid vehicle drive apparatus according to the embodiment of the present invention.

FIG. 4 is a skeleton diagram schematically illustrating essential components of the hybrid vehicle drive apparatus 101 (FIGS. 2 and 3) presented as a comparative example. Arrows in the drawing indicate flow of lubricating oil. As shown in FIG. 4, lubricating oil passing through the input shaft 3a and the like and supplied to the clutch chamber SP2 passes through a space radially outward of the guide member 63 of the clutch drum 60 and radially inward of the retaining member 233 of the rotor support member 23 and flows into the drain oil chamber SP3 through the oil discharge port 232a provided in the sidewall member 232 of the rotor support member 23. The drain oil chamber SP3 oil is collected in an unshown reservoir tank.

In the drive apparatus 101, the cover 24 attached to the right end portion of the rotor support member 23 prevents flow of hot lubricating oil from the clutch chamber SP2 to the motor chamber SP1. As a result, temperature rise of the motor 2 can be held down and degradation of motor 2 performance and service life owing to passage of high-temperature lubricating oil into the motor chamber SP1 can be prevented.

However, the drive apparatus 101 requires the cover 24 as a partition for isolating the motor chamber SP1 from the clutch chamber SP2. This results in a larger number of components and increases cost and weight of the drive apparatus 101. In view of this, the present embodiment configures the hybrid vehicle drive apparatus 100 as follows in order to readily isolate the motor chamber SP1 from the clutch chamber SP2 without using the cover 24.

Figure 5:
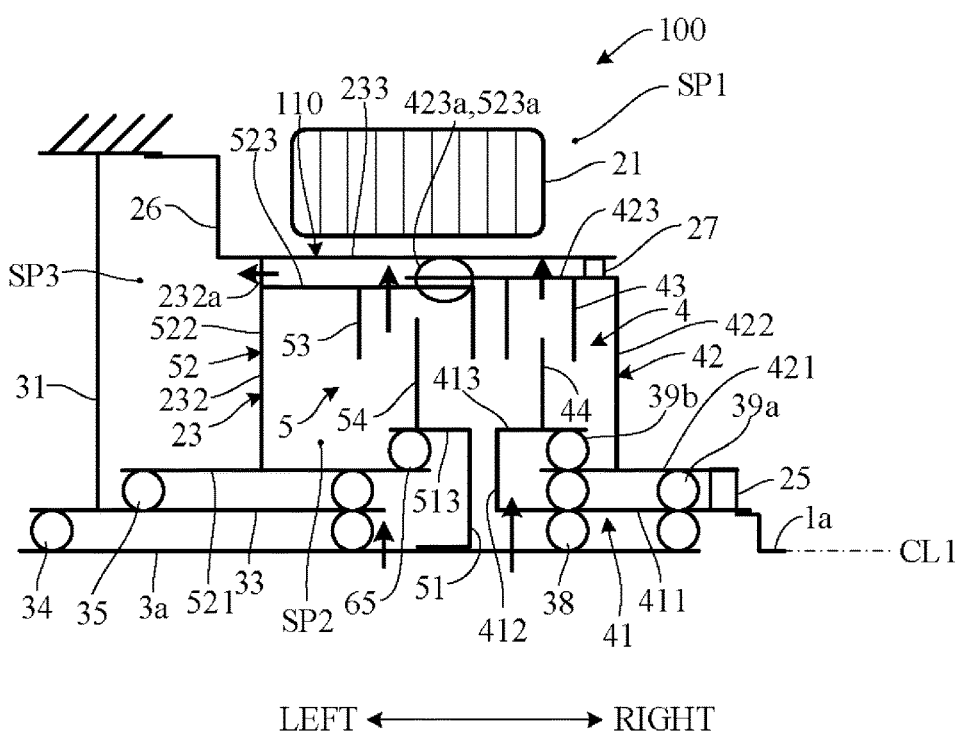
FIG. 5 is a skeleton diagram schematically showing essential components of the hybrid vehicle drive apparatus according to the embodiment of the present invention.

FIG. 5 is a skeleton diagram schematically illustrating essential components of a hybrid vehicle drive apparatus in accordance with an embodiment of the present invention. In FIG. 5, components identical with those of FIGS. 2 to 4 are assigned like symbols and the following explanation focuses mainly on points of difference from the drive apparatus 101. As shown in FIG. 5, the disconnect clutch 4 and start clutch 5 do not share a common clutch drum 60 as shown in FIG. 4 but have discrete clutch drums 42 and 52.

Clutch hub 51 of the start clutch 5 is configured similarly to its counterpart in FIG. 4, and inner plates 54 are axially movably engaged with guide member 513 of the clutch hub 51. The clutch drum 52 of the start clutch 5 is, similarly to its counterpart in FIG. 4, provided to be unitarily rotatable with rotor support member 23. Namely, the clutch drum 52 comprises axis CL1-centered, substantially cylindrically configured shaft member 521 rotatably supported by shaft member 33 of case members 30 through bearings 35, a sidewall member 522 extending radially outward from the shaft member 521, and a guide member 523 extending laterally from a radially outer end portion of the sidewall member 522; and outer plates 53 are axially movably engaged with the guide member 523.

On the other hand, in clutch hub 41 of the disconnect clutch 4, differently from in its counterpart in FIG. 4, sidewall 412 extends radially outward from a left end portion of shaft member 411. As a result, guide member 413 extends rightward from radially outer end portion of the sidewall 412 and inner plates 44 axially movably engage with the guide member 413. The clutch drum 42 comprises an axis CL1-centered, substantially cylindrically configured shaft member 421 rotatably supported by shaft member 411 and guide member 413 of the clutch hub 41 through bearings 39a and 39b, a sidewall member 422 extending radially outward from the shaft member 421 rightward of the guide member 413, and a guide member 423 extending leftward from a radially outer end portion of the sidewall member 422; and outer plates 43 are axially movably engaged with the guide member 423.

The guide member 423 of the clutch drum 42 is formed to a larger diameter than the guide member 523 of the clutch drum 52, and a left end portion of the guide member 423 is inserted between the guide member 523 and the retaining member 233 of the rotor support member 23. Splines 423a and 523a are formed respectively on an inner peripheral surface of a left end portion of this guide member 423 and on an outer peripheral surface of a right end portion of the guide member 523, and leftward movement of the clutch drum 42 relative to the clutch drum 52 engages the splines 423a and 523a with each other in a state with the left end portion of the guide member 423 covering an outer surface of the right end portion of the guide member 523. Since this spline-couples the clutch drums 42 and 52, the clutch drums 42 and 52 rotate unitarily. A seal member 27 (e.g., an O-ring) for sealing the clutch chamber SP2 is interposed between an outer peripheral surface of the guide member 423 of the clutch drum 42 and the inner peripheral surface of the retaining member 233 of the rotor support member 23.

As indicated by arrows in FIG. 5, lubricating oil supplied to the clutch chamber SP2 passes through through-holes of the guide members 423 and 523 of the clutch drums 42 and 52, radially outward through the guide members 423 and 523, and through the oil discharge port 232a of the rotor support member 23 into the drain oil chamber SP3. In the configuration of FIG. 5, the clutch chamber SP2 is formed by the clutch drum 42 and the rotor support member 23 integral with the clutch drum 52. The structural members forming such a clutch chamber SP2 are called cover members 110.

Thus in the present embodiment, the clutch drum 42 of the disconnect clutch 4 and the clutch drum 52 of the start clutch 5 are independently provided, the clutch drum 42 of the disconnect clutch 4 forms a partition between the clutch chamber SP2 and the motor chamber SP1, and the rotor support member 23 forms a partition between the clutch chamber SP2 and the drain oil chamber SP3. Specifically, the cover members 110 are formed by the clutch drum 42 and the rotor support member 23 integral with the clutch drum 52. Since this configuration eliminates the need to provide the cover 24 additionally required by the comparative example (FIG. 4), the number of components of the drive apparatus 100 can be reduced to realize lower cost and weight. Moreover, since the seal member 27 is provided between the retaining member 233 of the rotor support member 23 and the guide member 423 of the clutch drum 42, the gap between the retaining member 233 and the guide member 423 is sealed at their right ends, so that oil of the clutch chamber SP2 can be easily led to the drain oil chamber SP3 on the left side merely by opening a hole (oil discharge port 232a) for oil discharge in the rotor support member 23.

Figure 6:
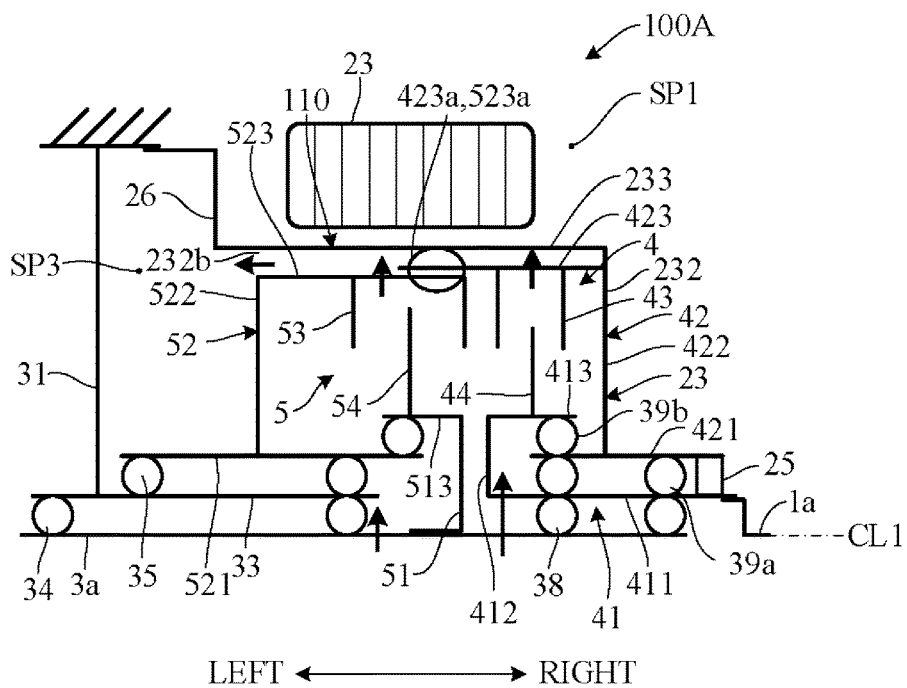
FIG. 6 is a skeleton diagram schematically showing essential components of a hybrid vehicle drive apparatus as an example for comparison with FIG. 5.

FIG. 6 is a diagram showing a drive apparatus 100A that is a modification of the drive apparatus 100 of FIG. 5. In the drive apparatus 100A of FIG. 6, position of the rotor support member 23 is laterally (left-right) reversed from that in FIG. 5. Therefore, the rotor support member 23 is provided on the right side of the clutch drum 42 of the disconnect clutch 4 to be unitarily rotatable with the clutch drum 42, and the cover members 110 are formed by the rotor support member 23 integral with the clutch drum 42, and the clutch drum 52. This structure eliminates the need for the seal member 27 of FIG. 5 because the gap between the retaining member 233 of the rotor support member 23 and the guide member 423 of the clutch drum 42 is closed at their right ends by the sidewall member 232 of the rotor support member 23. As indicated by arrows in FIG. 6, oil of the clutch chamber SP2 passes leftward through a gap between the retaining member 233 of the rotor support member 23 and the guide member 523 of the clutch drum 52 and then into the drain oil chamber SP3 through an oil discharge port 232b at a left end portion of this gap. In the arrangement of FIG. 6, therefore, the rotor support member 23 can be easily fabricated because it does not require machining for forming the oil discharge port (oil discharge hole) 232a of FIG. 5.

Figure 7:
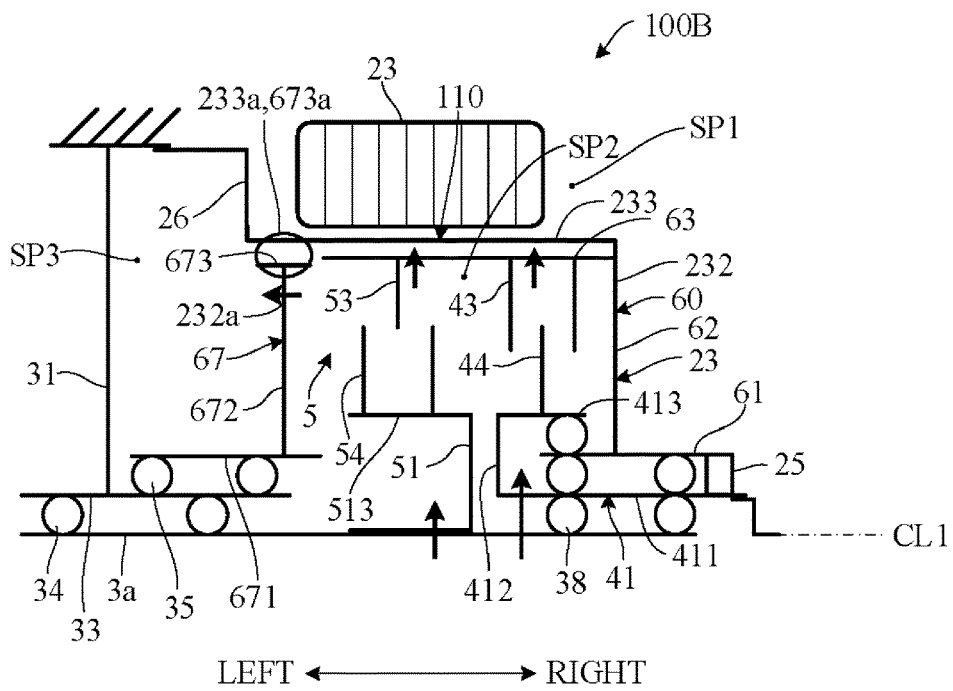
FIG. 7 is a skeleton diagram schematically showing essential components of a hybrid vehicle drive apparatus as another example for comparison with FIG. 5.

FIG. 7 is a diagram showing a drive apparatus 100B as another modification of the drive unit of FIG. 5. In the drive apparatus 100B of FIG. 7, differently from in the drive apparatus 100 of FIG. 5, the clutch drum 42 and the clutch drum 52 are formed by a shared single clutch drum 60, and the rotor support member 23 is provided on the right side of the clutch drum 60 to be unitarily rotatable with the clutch drum 60. In addition, a cover 67 is provided leftward of the clutch chamber SP2. The cover 67 comprises an axis CL1-centered substantially cylindrical shaft member 671 rotatably supported by the shaft member 33 through the bearings 35, a sidewall member 672 extending radially outward from the shaft member 671, and an axis CL1-centered substantially cylindrical shaft member (guide member) 673 provided on a radially outer end portion of the sidewall member 672. In the configuration of FIG. 7, the cover members 110 are formed by the rotor support member 23 integral with the clutch drum 60, and the cover 67.

The retaining member 233 is formed to a larger diameter than the guide member 673, and splines 673a and 233a are formed respectively on an outer peripheral surface of the guide member 673 and an inner peripheral surface of the retaining member 233. In a state with a left end portion of the retaining member 233 covering the guide member 673, the cover 67 and the rotor support member 23 are unitarily rotatably spline-coupled through the splines 673a and 233a. As indicated by arrows in FIG. 7, oil of the clutch chamber SP2 is led to the drain oil chamber SP3 through a radial direction gap between the retaining member 233 of the rotor support member 23 and the guide member 63 of the clutch drum 60, an axial direction gap between a left end portion of the guide member 63 and a right end portion of the guide member 673 of the cover 67, and a through-hole formed in the sidewall member 672 of the cover 67 (oil discharge port 232a). The present embodiment can achieve advantages and effects such as the following:

(1) The hybrid vehicle drive apparatus 100 comprises: the engine 1 having the output shaft 1a rotatable around the axis CL1; the transmission 3 having the input shaft 3a rotatable around the axis CL1; the motor 2 having the substantially cylindrical rotor 21 installed between the engine 1 and the transmission 3 to be rotatable around the axis CL1 and the stator 22 installed around the rotor 21; the multi-plate wet disconnect clutch 4 installed radially inward of the rotor 21 for connecting and disconnecting the first power transmission path TL1 between the output shaft 1a of the engine 1 and the motor 2; the multi-plate wet start clutch 5 installed radially inward of the rotor 21 axially in tandem with the disconnect clutch 4 for connecting and disconnecting the second power transmission path TL2 between the motor 2 and the input shaft 3a of the transmission 3; and cover members 110 that comprise the radially extending sidewall members 232, 422, 522 or sidewall members 62, 232, 672 and the substantially cylindrical guide members 423, 523 that connect the sidewall members 422, 522 or the substantially cylindrical guide members 63, 673 that connect the sidewall members 62, 672, are rotatable around the axis CL1 and rotate unitarily with the motor 2, form the clutch chamber SP2 enclosing the disconnect clutch 4 (particularly the plates 43, 44) and the start clutch 5 (particularly the plates 53, 54) by means of the sidewall members 232, 422, 522 and the guide members 423, 523 or by means of the sidewall members 62, 232, 672 and the guide members 63, 673, and are formed with the oil discharge ports 232a, 232b that communicate the clutch chamber SP2 and the drain oil chamber SP3 leftward of the clutch chamber SP2 (FIGS. 1 and 5 to 7). The cover members 110 include the axially disassemblable clutch drum 42 and rotor support member 23 and the clutch drum 52 (FIG. 5), or the rotor support member 23 and the clutch drum 42 and clutch drum 52 (FIG. 6), or the rotor support member 23 and the clutch drum 60 and cover 67 (FIG. 7). The clutch drum 42 and clutch drum 52 comprise the splines 423a, 523a for mutual unitarily rotatable fitting in axial direction (FIGS. 5 and 6), and the rotor support member 23 and cover 67 comprise the splines 233a, 673a for mutual unitarily rotatable fitting in axial direction (FIG. 7).

Owing to this configuration, the motor chamber SP1 can be readily isolated form the clutch chamber SP2. Therefore, when the disconnect clutch 4 and the start clutch 5 installed axially in tandem in the clutch chamber SP2 radially inward of the rotor 21, hot oil of the clutch chamber SP2 can be prevented from flowing into the motor chamber SP1, so that performance of the motor 2 can be improved and its service life extended. Moreover, the cover 24 (FIG. 4) for isolating the motor chamber SP1 from the clutch chamber SP2 can be omitted, whereby cost and weight of the drive apparatus 100 can be reduced. Since the cover members 110 are separated left and right, and the left and right cover members (clutch drums 42, 52 and the like) are unitarily rotatably connected through the splines 423a, 523a or 233a, 673a, the drive apparatus 100 also enjoys ease of assembly.

(2) The disconnect clutch 4 comprises the multiple inner plates 44 and multiple outer plates 43 alternately arranged axially to be rotatable relative to one another, the clutch hub 41 provided unitarily rotatable with the output shaft 1a of the engine 1 so as to axially movably support radially inner end portions of the inner plates 44, and the clutch drum 42, 60 for axially movably supporting radially outer end portions of the outer plates 43, and the start clutch 5 comprises the multiple inner plates 54 and multiple outer plates 53 alternately arranged axially to be rotatable relative to one another, the clutch hub 51 provided unitarily rotatable with the input shaft 3a of the transmission 3 so as to axially movably support radially inner end portions of the inner plates 54, and the clutch drum 52, 60 for axially movably supporting radially outer end portions of the outer plates 53 (FIGS. 5 to 7). The clutch drum 42, 60 or the rotor support member 23 connected to the clutch drum 42, 60 to rotate unitarily with the clutch drum 42, 60 forms a partition between the motor chamber SP1 and the clutch chamber SP2 (FIGS. 5 to 7). Since the clutch drum 42 or the rotor support member 23 integral with the clutch drum 42 therefore functions as a partition, the motor chamber SP1 can be readily isolated from the clutch chamber SP2.

(3) The cover members 110 include the clutch drum 42 of the disconnect clutch 4, and the clutch drum 52 of the start clutch 5 and rotor support member 23 formed unitarily rotatable with the clutch drum 52 and having the oil discharge port 232a, which are structured to be axially disassemblable from each other (FIG. 5). Owing to this configuration, the clutch drum 42 of the disconnect clutch 4 functions as a cover that isolates the motor chamber SP1 from the clutch chamber SP2, thereby enabling a reduction in number of components because additional provision of the cover 24 (FIG. 4) becomes unnecessary.

(4) The cover members 110 include the clutch drum 42 of the disconnect clutch 4 and rotor support member 23 provided unitarily rotatable with the clutch drum 42, and the clutch drum 52 of the start clutch 5, which are structured to be axially disassemblable from each other, and the oil discharge port 232b is provided between the inner peripheral surface of the retaining member 233 of the rotor support member 23 and an outer peripheral surface of the guide member 523 of the clutch drum 52 (FIG. 6). Owing to this configuration, the rotor support member 23 functions as a cover that isolates the motor chamber SP1 from the clutch chamber SP2, thereby enabling a still greater reduction in number of components because provision not only of the cover 24 (FIG. 4) but also of the seal member 27 of FIG. 5, or like means, between the guide member 423 and retaining member 233 becomes unnecessary.

(5) The clutch drum 42 of the disconnect clutch 4 and the clutch drum 52 of the start clutch 5 are formed by a single clutch drum 60, the cover members 110 include the clutch drum 60 and rotor support member 23 provided unitarily rotatable with the clutch drum 60, and the cover 67, and the oil discharge port 232a is provided in the cover 67 (FIG. 7). Owing to this configuration, the rotor support member 23 functions as a cover that isolates the motor chamber SP1 from the clutch chamber SP2, thereby enabling a reduction in number of components because the cover 24 (FIG. 4) becomes unnecessary and the clutch drums 42, 52 of the clutches 4, 5 are formed by a common member.

In the aforesaid embodiment, the multi-plate wet disconnect clutch 4 and start clutch 5 are installed axially in tandem radially inward of the rotor 21, but the first clutch and second clutch are not limited to the configuration described in the foregoing. Namely, the first clutch serving as the disconnect clutch 4 can be of any configuration insofar as it comprises the multiple inner plates 44 (first inner plates) and outer plates 43 (first outer plates) alternately arranged axially to be rotatable relative to one another, the clutch hub 41 (first clutch hub) provided unitarily rotatable with the output shaft 1a of the engine 1 (prime mover) so as to axially movably support radially inner end portions of the inner plates 44, and the clutch drum 42 (first clutch drum) for axially movably supporting radially outer end portions of the outer plates 43. And the second clutch serving as the start clutch 5 can be of any configuration insofar as it comprises the multiple inner plates 54 (second inner plates) and outer plates 53 (second outer plates) alternately arranged axially to be rotatable relative to one another, the clutch hub 51 (second clutch hub) provided unitarily rotatable with the input shaft 3a of the transmission 3 so as to axially movably support radially inner end portions of the inner plates 54, and the clutch drum 52 (second clutch drum) for axially movably supporting radially outer end portions of the outer plates 53.

In the aforesaid embodiment, the cover members 110 include the right sidewall member 422 or the like serving as a first sidewall member and the left sidewall member 522 or the like serving as a second sidewall member, which sidewall members extend radially from opposite axial sides of the clutches 4, 5, respectively, and the substantially cylindrical guide members 423, 523 or the like serving as connection members for connecting the sidewall members with each other, but the cover members are not limited to this configuration. Namely, the cover members can be of any configuration insofar as they include an axially separated first cover member (clutch drum 42 or the like) and second cover member (clutch drum 52 or the like), have fitting members (splines 423a, 523a or the like) that unitarily rotatably fit the cover members together axially, and are formed to enclose at least the inner plates 44, 54 and outer plates 43, 53 of the clutches 4, 5. In the aforesaid embodiment, the rotor support member 23 is unitarily rotatably connected to the clutch drum 42, 52 or 60, but the rotor connected to the first clutch drum and unitarily rotated with the first clutch drum is not limited to that described in the foregoing.

The above embodiment can be combined as desired with one or more of the above modifications. The modifications can also be combined with one another.

According to the present invention, it is possible to prevent passage of high-temperature lubricating oil of a clutch chamber into an accommodating space for a motor, thereby improving motor performance and extending motor service life. Moreover, since there is no need to provide an additional cover or the like for separating the clutch chamber from the accommodating space for the motor, it is possible to reduce the number of components, thereby lowering cost and weight of the apparatus.

Above, while the present invention has been described with reference to the preferred embodiments thereof, it will be understood, by those skilled in the art, that various changes and modifications may be made thereto without departing from the scope of the appended claims.

What is claimed is:

1. A hybrid vehicle drive apparatus, comprising:
   a prime mover having an output shaft rotatable around an axis line;
   a transmission having an input shaft rotatable around the axis line;
   an electric motor having a rotor of substantially cylindrical shape provided between the prime mover and the transmission to be rotatable around the axis line, and a stator arranged around the rotor;
   a first clutch of multi-plate wet type arranged radially inward of the rotor and configured to connect and disconnect a first power transmission path between the output shaft of the prime mover and the electric motor;
   a second clutch of multi-plate wet type arranged radially inward of the rotor and side by side with the first clutch in an axial direction of the axis line, and configured to connect and disconnect a second power transmission path between the electric motor and the input shaft of the transmission; and
   a cover member having a first sidewall member and a second sidewall member each extending radially and a connection member of substantially cylindrical shape configured to connect the first sidewall member and the second sidewall member, the cover member being rotatably provided around the axial line to integrally rotate with the electric motor, the cover member forming a clutch chamber enclosing the first clutch and the second clutch by means of the first sidewall member, the second sidewall member and the connection member, the cover member being formed with an oil discharge port connecting the clutch chamber and a drain oil chamber sideward of the clutch chamber, wherein
   the cover member has a first cover member and a second cover member axially disassemblable at the connection member, and each of the first cover member and the second cover member has a fitting member fitted in the axial direction to be integrally rotatable with each other.

2. The hybrid vehicle drive apparatus according to claim 1, wherein
   the first clutch has:
   a plurality of first inner plates and a plurality of first outer plates alternately arranged in the axial direction to be rotatable relative to each other;
   a first clutch hub provided integrally rotatable with the output shaft of the prime mover, and supporting a radially inner end portions of the plurality of first inner plates movably in the axial direction; and
   a first clutch drum supporting a radially outer end portions of the plurality of first outer plates movably in the axial direction,
   the second clutch has:
   a plurality of second inner plates and a plurality of second outer plates alternately arranged in the axial direction to be rotatable relative to each other;
   a second clutch hub provided integrally rotatable with the input shaft of the transmission, and supporting a radially inner end portions of the plurality of second inner plates movably in the axial direction; and
   a second clutch drum supporting a radially outer end portions of the plurality of second outer plates movably in the axial direction, and
   the first cover member is constituted by a first clutch drum, or a rotating member connected to the first clutch drum to integrally rotate with the first clutch drum.

3. The hybrid vehicle drive apparatus according to claim 2, wherein
the first cover member is constituted by the first clutch drum, and
the second cover member is constituted by the rotating member provided integrally rotatable with the second clutch drum, and the rotating member is formed with the oil discharge port.

4. The hybrid vehicle drive apparatus according to claim 2, wherein
the cover member is constituted by the rotating member provided integrally rotatable with the first clutch drum,
the second cover member is constituted by the second clutch drum, and
the oil discharge port is provided between an inner peripheral surface of the rotating member and an outer peripheral surface of the second clutch drum.

5. The hybrid vehicle drive apparatus according to claim 2, wherein
the first clutch drum and the second clutch drum are constituted by a single clutch drum,
the first cover member is constituted by the rotating member provided integrally rotatable with the single clutch drum, and
the second cover member is formed with the oil discharge port.

6. The hybrid vehicle drive apparatus according to claim 2, wherein
the first clutch hub has:
a guide member of substantially cylindrical shape supporting the plurality of first inner plates movably in the axial direction; and
a hub shaft member of substantially cylindrical shape arranged radially inward of the guide member and rotatably supported around an outer peripheral surface of the input shaft, and
the first clutch drum has:
a guide member of substantially cylindrical shape supporting the plurality of first outer plates movably in the axial direction; and
a drum shaft member rotatably supported between the guide member of the first clutch hub and the hub shaft member through a bearing.

7. The hybrid vehicle drive apparatus according to claim 1, wherein
the second cover member has a shaft member of substantially cylindrical shape rotatably supported around a shaft member of a non-rotating case member.

8. The hybrid vehicle drive apparatus according to claim 1, wherein
each of the first cover member and the second cover member has a cylindrical member constituting the connection member, the fitting member of the first cover member has a spline formed on an inner peripheral surface of the cylindrical member of the first cover member, and the fitting member of the second cover member has a spline formed on an outer peripheral surface of the cylindrical member of the second cover member.

* * * * *